US009485501B2

(12) United States Patent
De Paepe et al.

(10) Patent No.: US 9,485,501 B2
(45) Date of Patent: Nov. 1, 2016

(54) METHOD AND SYSTEM FOR DETERMINING IMAGE RETENTION

(75) Inventors: Lode René Eleonora De Paepe, Ghent (BE); Goert F. M. Carrein, Moorslede (BE)

(73) Assignee: Barco N.V., Kortrijk (BE)

( * ) Notice: Subject to any disclaimer, the term of this patent is extended or adjusted under 35 U.S.C. 154(b) by 39 days.

(21) Appl. No.: 14/367,427

(22) PCT Filed: Dec. 30, 2011

(86) PCT No.: PCT/EP2011/074311
§ 371 (c)(1),
(2), (4) Date: May 27, 2015

(87) PCT Pub. No.: WO2013/097907
PCT Pub. Date: Jul. 4, 2013

(65) Prior Publication Data
US 2015/0256823 A1 Sep. 10, 2015

(51) Int. Cl.
*H04N 17/00* (2006.01)
*H04N 17/02* (2006.01)
*H04N 17/04* (2006.01)
(Continued)

(52) U.S. Cl.
CPC .............. *H04N 17/04* (2013.01); *G09G 3/006* (2013.01); *G09G 3/36* (2013.01); *G09G 2320/0252* (2013.01); *G09G 2320/0693* (2013.01)

(58) Field of Classification Search
USPC ....... 348/177, 175, 180, 181, 189, 166, 145, 348/49, 42, 274, 354, 373, 673, 686, 687; 382/274, 199, 209, 106
See application file for complete search history.

(56) References Cited

U.S. PATENT DOCUMENTS 5,351,201 A 9/1994 Harshbarger, Jr.
6,324,260 B1 * 11/2001 Sugino ................. H04B 14/048
370/247

(Continued)

FOREIGN PATENT DOCUMENTS

JP 2000227775 A 8/2000
JP 2001175212 A 6/2001

(Continued)

OTHER PUBLICATIONS

International Preliminary Report on Patentability mailed Jul. 1, 2014 for corresponding International Application No. PCT/EP2011/074311.

(Continued)

*Primary Examiner* — Jefferey Harold
*Assistant Examiner* — Mustafizur Rahman
(74) *Attorney, Agent, or Firm* — Renner, Otto, Boisselle and Sklar LLP

(57) ABSTRACT

A system and method for measuring and quantifying image retention in a display device. The method involves displaying a test pattern (206, 306, 406, 606, 706) having at least one dark feature (210, 310, 410, 610) and at least one light feature (208, 308, 408, 608). The method further involves the displaying an analysis pattern (202, 302, 402, 602) having at one gradient feature (204, 304, 404, 604*a-c*) with a plurality of regions of different levels. The levels of the gradient feature may then be matched up with the levels displayed in the regions formerly displaying the dark feature (210, 310, 410, 610) and/or the light feature (208, 308, 408, 608). Thus, image retention may be determined by visual inspection.

19 Claims, 7 Drawing Sheets

(51) Int. Cl.
*G09G 3/00* (2006.01)
*G09G 3/36* (2006.01)

(56) References Cited

U.S. PATENT DOCUMENTS

| | | | |
|---|---|---|---|
| 7,511,739 B2* | 3/2009 | Tsujino | H04N 5/235 |
| | | | 348/222.1 |
| 7,587,080 B1 | 9/2009 | Good | |
| 7,952,597 B2 | 5/2011 | Kubota et al. | |
| 8,559,748 B2* | 10/2013 | Banerjee | G06K 9/3283 |
| | | | 382/266 |
| 8,891,866 B2* | 11/2014 | Shinozaki | G06T 5/00 |
| | | | 382/167 |
| 8,923,610 B2* | 12/2014 | Guo | H04N 1/387 |
| | | | 382/164 |
| 2002/0024456 A1 | 2/2002 | Fields | |
| 2002/0097395 A1 | 7/2002 | Smith et al. | |
| 2003/0122956 A1* | 7/2003 | Sugimoto | H04N 5/238 |
| | | | 348/362 |
| 2003/0137587 A1 | 7/2003 | Braun | |
| 2004/0021831 A1* | 2/2004 | Koide | H04N 9/3138 |
| | | | 353/31 |
| 2004/0151017 A1* | 8/2004 | Kawasaki | G11C 29/14 |
| | | | 365/145 |
| 2005/0067555 A1* | 3/2005 | Roberts | G01M 11/06 |
| | | | 250/208.2 |
| 2005/0157225 A1* | 7/2005 | Toyooka | G02B 5/3016 |
| | | | 349/99 |
| 2005/0206859 A1* | 9/2005 | Miyasaka | G03B 21/00 |
| | | | 353/122 |
| 2006/0012608 A1* | 1/2006 | Lee | G09G 3/3413 |
| | | | 345/591 |
| 2006/0177148 A1* | 8/2006 | Sumiya | H04N 5/235 |
| | | | 382/274 |
| 2006/0247877 A1* | 11/2006 | Bala | H04N 17/04 |
| | | | 702/107 |
| 2007/0067124 A1 | 3/2007 | Kimpe et al. | |
| 2007/0110319 A1* | 5/2007 | Wyatt | G06K 9/40 |
| | | | 382/199 |
| 2008/0043153 A1* | 2/2008 | Cha | G09G 5/10 |
| | | | 348/687 |
| 2008/0106508 A1 | 5/2008 | Lee | |
| 2008/0126924 A1* | 5/2008 | Casey | G06F 17/246 |
| | | | 715/227 |
| 2008/0303766 A1 | 12/2008 | Lee et al. | |
| 2009/0096778 A1 | 4/2009 | Su et al. | |
| 2009/0231483 A1* | 9/2009 | Seddik | H04N 5/2256 |
| | | | 348/373 |
| 2010/0045700 A1* | 2/2010 | Lefevre | G02B 23/00 |
| | | | 345/633 |
| 2010/0142830 A1* | 6/2010 | Yahata | G06F 3/042 |
| | | | 382/209 |
| 2011/0050750 A1 | 3/2011 | Zhao | |
| 2011/0063412 A1* | 3/2011 | Tsukagoshi | H04N 13/0018 |
| | | | 348/42 |
| 2011/0069176 A1* | 3/2011 | Lin | H04N 5/2257 |
| | | | 348/175 |
| 2011/0317028 A1* | 12/2011 | Shinmei | H04N 5/2355 |
| | | | 348/223.1 |
| 2012/0025462 A1* | 2/2012 | Knowlton | A63F 9/10 |
| | | | 273/157 R |
| 2013/0050520 A1* | 2/2013 | Takeuchi | H04N 5/3535 |
| | | | 348/222.1 |

FOREIGN PATENT DOCUMENTS

| | | |
|---|---|---|
| JP | 2002351442 A | 12/2002 |
| JP | 2009258732 A | 11/2009 |
| WO | 2010/007108 A1 | 1/2010 |

OTHER PUBLICATIONS

International Search Report and Written Opinion for corresponding International Application No. PCT/EP2011/074311 mailed Oct. 10, 2012.

Stacey Spears & Don Munsil, "Technical Notes on the Patterns", Spearsandmunsil.com, Feb. 2, 2010, pp. 1-13.

* cited by examiner

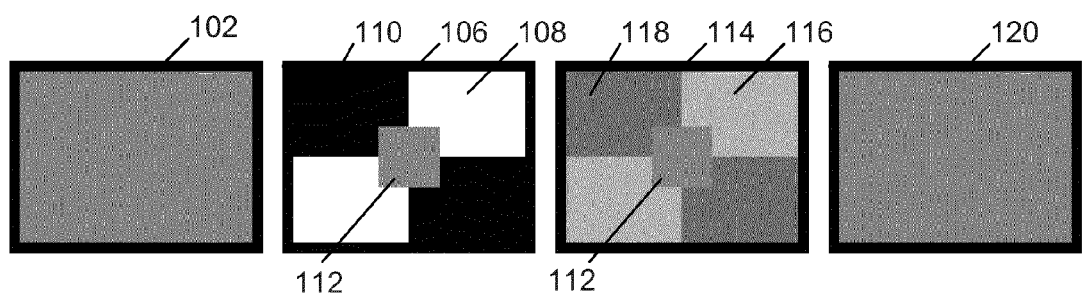
FIG. 1A  FIG. 1B  FIG. 1C  FIG. 1D
(Prior Art)
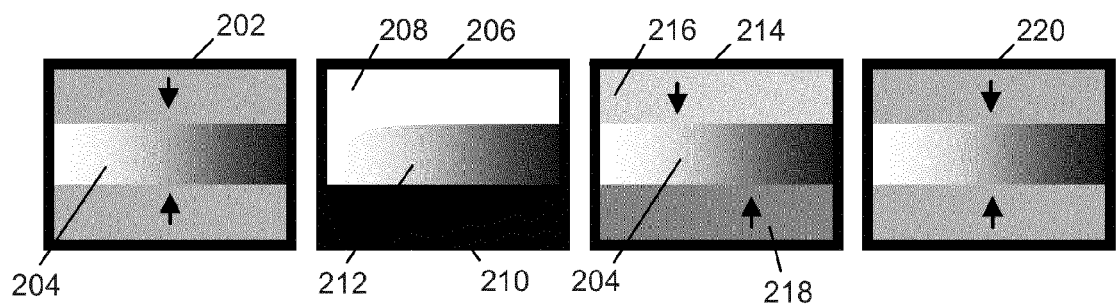
FIG. 2A  FIG. 2B  FIG. 2C  FIG. 2D

METHOD AND SYSTEM FOR DETERMINING IMAGE RETENTION

This application is a national phase of International Application No. PCT/EP2011/074311 filed Dec. 30, 2011 and published in the English language.

FIELD OF THE INVENTION

The present invention relates generally to display devices, and particularly to methods and systems for analyzing display devices.

BACKGROUND

With respect to display devices, one factor that can negatively impact display accuracy is image retention. Image retention, also referred to as image sticking or image persistence, is a well known phenomenon in displays, particularly in LCD displays. Image retention occurs when after a static image is displayed for a certain period of time, subsequent images are affected by the static image such that a low contrast version of the static image remains visible in the new images. Unlike image burn-in, image retention is reversible. Once the static image is removed and new images are displayed, the contrast of the residual static image will gradually decrease until it becomes no longer perceptible by the human eye. The period during which the static image is visible is referred to as the image retention period. Susceptibility of a display to image retention may be influenced by ionic impurities in the liquid crystal and the driving conditions and may increase with the display usage.

When a display is used for applications such as medical diagnostics, the display may not achieve the required accuracy during the image retention period. Several methods have been proposed to quantify the image retention phenomenon. For example, luminance meters may be used to take measurements at different positions on the screen of the display. Because image retention is a time dependent effect, the luminance meters are required to simultaneously obtain data from different points.

Another method for determining image retention involves the use of a charge-coupled device detector and colorimeter to acquire objective image data for later processing and determining an objective measure for image retention. The required equipment is expensive and measurements need to be performed in a controlled environment, making it difficult to determine image retention at a customer's on site location.

One known method to quantify image retention based on visual feedback is to measure the time it takes for the sticking image to disappear. With this method there is still room for subjective errors in judging when the residual image has fully disappeared as well as errors in determining the timing. Also, this method provides no information on how the residual image evolves over time.

SUMMARY OF THE INVENTION

The present invention provides a system and method for measuring and quantifying image retention in a display device. The method involves displaying a test pattern having at least one dark feature and at least one light feature. The method further involves displaying an analysis pattern having at least one gradient feature with a plurality of regions of different levels. The gradient feature may be located such that it is near a location where at least one dark feature of the test pattern was displayed and/or near a location where at least one light feature of the test pattern was displayed. The levels of the gradient feature may then be matched up with the levels displayed in the regions formerly displaying the dark feature and the light feature. Thus, image retention may be determined by visual inspection. In addition, the levels of the gradient may be correlated with digital driving levels (DDLs) thereby enabling quantification of image retention by visual inspection.

Accordingly, one aspect of the invention provides a method for evaluating the image retention of a display. The method may include instructing the display device to output a test pattern having at least one dark feature and at least one light feature; and instructing the display device to output an analysis pattern having at least one gradient feature comprising a plurality of regions of different levels. At least one of the at least one gradient feature may be near a location of the display formerly showing a dark feature, and at least one of the at least one gradient feature may be near a location of the display formerly showing a light feature.

According to one aspect, the analysis pattern may further include a dark analysis intermediate brightness feature in the location of the display formerly showing a dark feature. In addition, the method may further include comparing the dark analysis intermediate brightness feature and the gradient feature to determine the location of the gradient feature at which the difference in brightness between the dark analysis intermediate brightness feature and the gradient feature is minimized.

According to one aspect, the analysis pattern may further include a light analysis intermediate brightness feature in the location of the display formerly showing a light feature. In addition, the method may further include comparing the light analysis intermediate brightness feature and the gradient feature to determine the location of the gradient feature at which the difference in brightness between the light analysis intermediate brightness feature and the gradient feature is minimized.

According to one aspect, the change in the levels of the plurality of regions of the at least one gradient feature is defined by a linear or non-linear function.

According to one aspect, the plurality of regions of different levels of the at least one gradient feature of the analysis pattern may be immediately adjacent and in contact with one another. In addition, the at least one gradient feature may include dithering between the plurality of regions of different levels.

According to one aspect, the number of DDLs represented by the plurality of regions of the at least one gradient feature may range from about 1 to about 15.

According to one aspect, the method may further include instructing the display device to output the analysis pattern prior to instructing the display device to output the test pattern.

According to one aspect, the method may further include displaying a key indicating a correlation between output light level and DDL.

According to one aspect, the method may further include indicating a length of time during which at least one of the test pattern or the analysis pattern is output.

According to one aspect, the method may further include capturing with a camera the analysis pattern output by the display device.

According to one aspect, a single gradient feature of the analysis pattern may be near both a location of the display formerly showing a dark feature and a location of the display formerly showing a light feature.

According to one aspect, the test pattern may include at least one gradient feature comprising a plurality of regions of different levels, wherein the at least one gradient feature is near at least one of the at least one dark feature or at least one of the at least one light feature. In addition, the gradient feature of the test pattern and the gradient feature of the analysis pattern may be identical.

According to one aspect, the analysis pattern may include: a first gradient feature located at the location of the display formerly showing a dark feature; and a second gradient feature located at the location of the display formerly showing a light feature. In addition, the first and second gradient features may be oriented in opposite directions. Also, the range of light levels represented by the first gradient feature may only partially overlap the range of light levels represented by the second gradient feature. Accordingly, a method for determining image retention may further include comparing the first gradient feature and the second gradient feature to determine the portions of the first gradient feature and second gradient feature at which difference in brightness between the first gradient feature and the second gradient feature is minimized.

According to one aspect, the test pattern may include a plurality of alternating dark features and light features and the analysis pattern may include three regions, wherein the first region comprises alternating opposing direction light intermediate brightness gradients located at locations of the display formerly showing alternating dark features and light features, wherein the second region may include alternating opposing direction mid intermediate brightness gradients located at locations of the display formerly showing alternating dark features and light features, and wherein the third region may include alternating opposing direction dark intermediate brightness gradients located at locations of the display formerly showing alternating dark features and light features. In addition, the ranges of light levels of the alternating opposing direction light intermediate brightness gradients may only partially overlap, the ranges of light levels of the alternating opposing direction mid intermediate brightness gradients may only partially overlap, and the ranges of light levels of the alternating opposing direction dark intermediate brightness gradients may only partially overlap.

In addition, the ranges of levels of the alternating opposing direction light intermediate brightness gradients may overlap within the upper third of the display device's brightness range; the ranges of levels of the alternating opposing direction mid intermediate brightness gradients may overlap within the middle third of the display device's brightness range; and the ranges of levels of the alternating opposing direction dark intermediate brightness gradients may overlap within the lower third of the display device's brightness range.

According to one aspect, a system for evaluating the image retention of a display device may include computer readable code on a non-transitory computer readable medium, wherein the computer readable code is adapted to perform the methods discussed herein.

The features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope.

Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

FIGS. 1A-D are representations of analysis and test patterns used in a prior art methodology for determining image retention;

FIGS. 2A-D are representations of sample analysis and test patterns used for determining image retention;

DETAILED DESCRIPTION

Figure 3A:
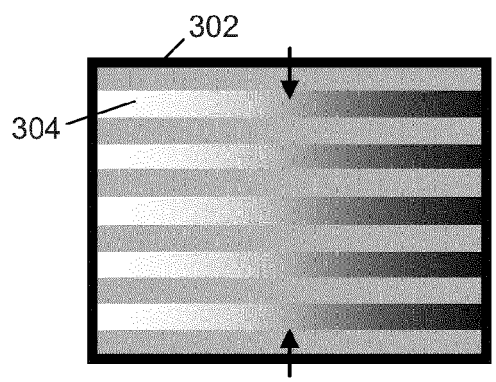
FIGS. 3A-C are representations of sample analysis and test patterns used for determining image retention.

The present invention provides a system and method for measuring and quantifying image retention in a display device. The method involves displaying a test pattern having at least one dark feature and at least one light feature. The method further involves displaying an analysis pattern having at least one gradient feature with a plurality of regions of different levels. The levels of the gradient feature may then be matched up with the levels displayed in the regions formerly displaying the dark feature and the light feature. Thus, image retention may be determined by visual inspection.

As used herein, the terms "display" and "display device" are not intended to be limited to any particular types of displays, and include such things as cathode ray tube devices, projectors, and any other apparatus or device that is capable of displaying an image for viewing and is susceptible to image retention.

Turning initially to FIGS. 1A-D, representations of analysis and test patterns used in a prior art methodology for determining image retention are provided. FIG. 1A illustrates an analysis pattern 102 and FIG. 1B illustrates a test pattern 106. The test pattern 106 may include light features 108 and dark features 110, which may be in a checkerboard pattern. The test pattern 106 may also include an intermediate feature 112, which may be the same brightness as the analysis pattern 102 (e.g., 50% black, or a shade of gray resulting from a digital driving level (DDL) of 128 in an 8-bit per channel system). As used herein, the term "brightness" may refer to any brightness or any level of gray. Accordingly, a shade of gray produced with a DDL of 128 may be considered to be a different brightness than a shade of gray produced with a DDL of 64.

The test pattern 106 is displayed for a period time, after which the analysis pattern 102 is immediately displayed. FIG. 1C illustrates an image retention analysis pattern 114, which is the result of displaying the analysis pattern 102 after the test pattern 106. The image retention analysis pattern 114 may include light features 116 displayed at a location formerly showing light features 108 of the test pattern 106 and dark features 118 displayed at locations formerly showing dark features 110 of the test pattern 106.

To quantify image retention, one can measure the amount of time it takes for the image retention effect to vanish completely, as illustrated at final pattern 120 of FIG. 1D. In addition, the length of time the test pattern 106 is displayed and the DDL displayed in the analysis pattern are variables that affect the measurement result. The method of FIGS. 1A-C does not provide a mechanism for determining the amplitude of image retention. In addition, it may be difficult for a viewer to determine exactly when the image retention effect vanishes completely, and the viewer's ability to discern the differences in light levels may be influenced by ambient lighting conditions.

Another prior art method for determining image retention involves the matching of a level of a light feature 116 or a dark feature 118 with the level of the intermediate feature 112, which has the same level as the analysis pattern 102 and is uninfluenced by the light features 108 and the dark features 110 of the test pattern 104. The offset needed for matching indicates for the image retention amplitude at the time of matching. This method allows matching with visual judgment, as well as by an image capturing device and image processing. For example, a sequence of images may be generated with varying levels of correction until the light feature 116 (or dark feature 118) shows the same level as the intermediate feature 112. The visual method can be difficult because it relies on a viewer's visual memory while determining the correction value that provides the best match, and because matching levels can be challenging as image retention decreases as a function of time. In addition, it also may be difficult to visually quantify an image retention value after a defined time period, and the ability for a viewer to discern the differences in light levels may be influenced by ambient lighting conditions. Also, the image capturing method may be cumbersome and requires additional equipment and time.

Turning next to FIGS. 2A-D, representations of sample analysis and test patterns used for determining image retention according to an aspect of the invention are provided. FIG. 2A illustrates an analysis pattern 202 and FIG. 2B illustrates a test pattern 204. The analysis pattern 202 may include a gradient feature 204 having a plurality of regions of different levels. In addition, the regions of the analysis pattern 202 near the gradient feature 204 may be any suitable brightness. For example, the analysis pattern 202 may include regions that have a brightness residing within the spectrum of brightness present in the gradient feature 204. In addition, the arrows in FIG. 2A illustrate the locations along the gradient feature 204 where the difference in brightness between the gradient feature 204 and the regions of the analysis pattern 202 near the gradient feature 204 are minimized. The locations where the difference in brightness between the gradient feature 204 and the regions of the analysis pattern 202 near the gradient feature 204 are minimized may also be the locations where the contrast between the gradient feature 204 and the regions of the analysis pattern 202 near the gradient feature 204 is minimized.

As shown in FIG. 2B, the test pattern 206 may include a light feature 208 and a dark feature 210. The test pattern 206 may also include a gradient feature 212. In one embodiment, the gradient feature 212 and the gradient feature 204 are identical. In one embodiment, the gradient feature 212 may include a plurality of regions of different levels. In addition, the gradient feature 212 may be near the light feature 208 and/or the dark feature 210. The test pattern 206 is displayed for a period time. It will be understood by those of ordinary skill in the art that different display periods may be utilized. In addition, prior to displaying the test pattern 206, the analysis pattern 202 may be displayed to provide a baseline image for the viewer.

Immediately following display of the test pattern 206, the analysis pattern 202 is displayed. FIG. 2C illustrates an image retention analysis pattern 214, which is the result of displaying the analysis pattern 202 after the test pattern 206. The analysis pattern 202 may include a gradient feature 204 near the location of the display formerly showing the light feature 208 of the test pattern 206 and/or near the location of the display formerly showing the dark feature 210 of the test pattern 206. In one embodiment, a single gradient feature 204 is near both the location of the display formerly showing the light feature 208 and the location of the display formerly showing the dark feature 210. The image retention analysis pattern 214 also may include a light analysis intermediate brightness feature 216 displayed at a location formerly showing a light feature 208 of the test pattern 206 and a dark analysis intermediate brightness feature 218 displayed at a location formerly showing a dark feature 210 of the test pattern 206.

To determine image retention, a comparison can be made between the light analysis intermediate brightness feature 216 and the gradient feature 204 to determine the location along the gradient feature 204 where the difference in brightness between the gradient feature 204 and the light analysis intermediate brightness feature 216 is minimized. Similarly, a comparison can be made between the dark analysis intermediate brightness feature 218 and the gradient feature 204 to determine the location along the gradient feature 204 where the difference in brightness between the gradient feature 204 and the dark analysis intermediate brightness feature 218 is minimized.

The arrows of FIG. 2C illustrate the respective locations where such differences in brightness are minimized. If there is no image retention, the arrows in FIGS. 2A and 2C will be located at the same positions. As shown in FIG. 2C, some image retention is present, causing the light analysis intermediate brightness feature 216 to be lighter than the region of the analysis pattern 202 near the gradient feature 204 in FIG. 2A. Image retention also causes the dark analysis intermediate brightness feature 218 to be darker than the region of the analysis pattern 202 near the gradient feature 204 in FIG. 2A. Accordingly, the greater the separation of the arrows in FIG. 2C, the greater the image retention.

Because image retention is a factor of time, the display will eventually return to an analysis pattern 220 in which no image retention is present, as shown in FIG. 2D.

Figure 3B:
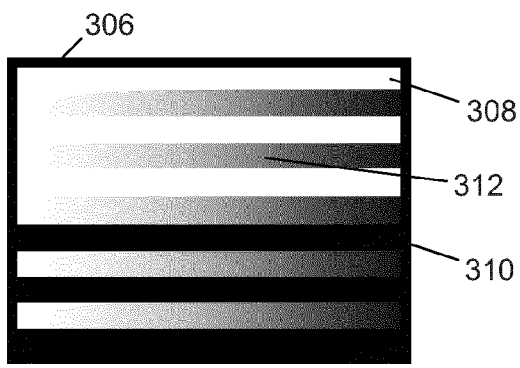
Figure 3C:
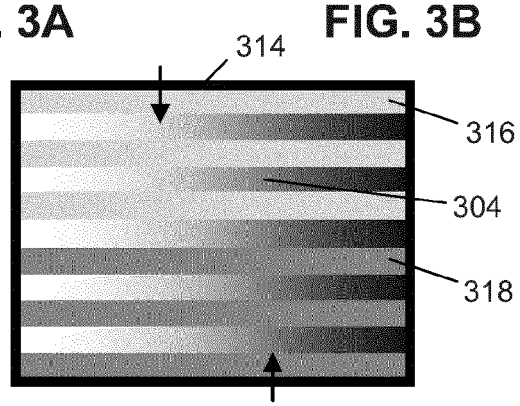

Turning next to FIGS. 3A-C, representations of sample analysis and test patterns used for determining image retention according to an aspect of the invention are provided. FIG. 3A illustrates an analysis pattern 302 and FIG. 3B illustrates a test pattern 304. The analysis pattern 302 may include a plurality of gradient features 304 each having a plurality of regions of different levels. In addition, the regions of the analysis pattern 302 near the gradient features 304 may be any suitable brightness. For example, the analysis pattern 302 may include regions that have a brightness residing within the spectrum of brightness present in the gradient features 304. In addition, the arrows in FIG. 3A illustrate the locations along the gradient features 304 where the difference in brightness between the gradient features 304 and the regions of the analysis pattern 302 near the gradient features 304 are minimized. The locations where the difference in brightness between the gradient features 304 and the regions of the analysis pattern 302 near the gradient features 304 are minimized may also be the locations where the contrast between the gradient features 304 and the regions of the analysis pattern 302 near the gradient features 304 is minimized.

As shown in FIG. 3B, the test pattern 306 may include a plurality of light features 308 and a plurality of dark features 310. The test pattern 306 may also include a plurality of gradient features 312. In one embodiment, the gradient features 312 and the gradient features 304 are identical. In one embodiment, the gradient features 312 may include a plurality of regions of different levels. In addition, the gradient features 312 each may be near a light feature 308 and/or a dark feature 310. The test pattern 306 is displayed for a period time. It will be understood by those of ordinary skill in the art that different display periods may be utilized. In addition, prior to displaying the test pattern 306, the analysis pattern 302 may be displayed to provide a baseline image for the viewer.

Immediately following display of the test pattern 306, the analysis pattern 302 is displayed. FIG. 3C illustrates an image retention analysis pattern 314, which is the result of displaying the analysis pattern 302 after the test pattern 306. The analysis pattern 302 may include a plurality of gradient features 304 near the locations of the display formerly showing the light features 308 of the test pattern 306 and/or near the locations of the display formerly showing the dark features 310 of the test pattern 306. In one embodiment, a single gradient feature 304 is near both a location of the display formerly showing a light feature 308 and a location of the display formerly showing a dark feature 310. The image retention analysis pattern 314 also may include a plurality of light analysis intermediate brightness features 316 displayed at locations formerly showing light features 308 of the test pattern 306 and a plurality of dark analysis intermediate brightness features 318 displayed at locations formerly showing dark features 310 of the test pattern 306.

To determine image retention, comparisons can be made between the light analysis intermediate brightness features 316 and the gradient features 304 to determine the locations along the gradient features 304 where the differences in brightness between the gradient features 304 and the light analysis intermediate brightness features 316 are minimized. Similarly, comparisons can be made between the dark analysis intermediate brightness features 318 and the gradient features 304 to determine the locations along the gradient features 304 where the differences in brightness between the gradient features 304 and the dark analysis intermediate brightness features 318 are minimized.

The arrows of FIG. 3C illustrate the respective locations where such differences in brightness are minimized. If there is no image retention, the arrows in FIGS. 3A and 3C will be located at the same positions. As shown in FIG. 3C, some image retention is present, causing the light analysis intermediate brightness features 316 to be lighter than the regions of the analysis pattern 302 near the gradient features 304 in FIG. 3A. Image retention also causes the dark analysis intermediate brightness features 318 to be darker than the regions of the analysis pattern 302 near the gradient features 304 in FIG. 3A. Accordingly, the greater the separation of the arrows in FIG. 3C, the greater the image retention.

Figure 4A:
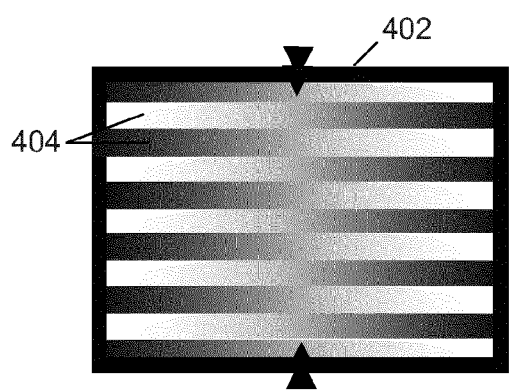
FIGS. 4A-D are representations of sample analysis and test patterns used for determining image retention.
Figure 4B:
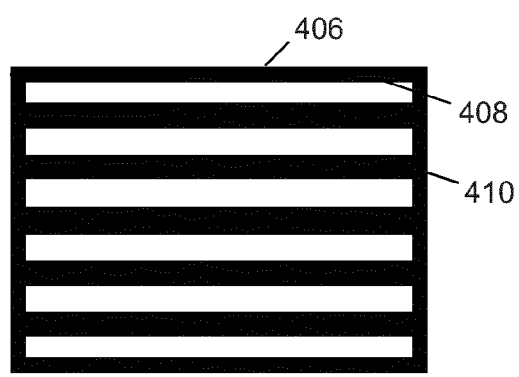
Figure 4C:
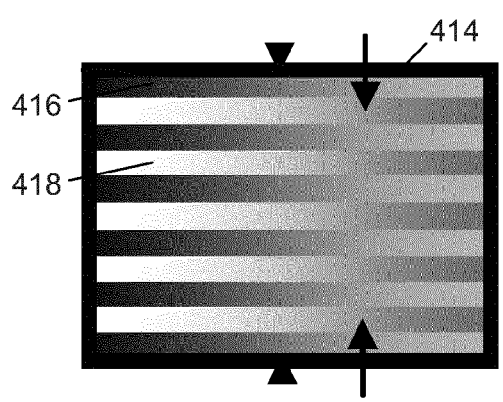

Turning next to FIGS. 4A-C, representations of sample analysis and test patterns used for determining image retention according to an aspect of the invention are provided. FIG. 4A illustrates an analysis pattern 402 and FIG. 4B illustrates a test pattern 406. The analysis pattern 402 may include a plurality of gradient features 404 each having a plurality of regions of different levels. The analysis pattern 402 is similar to the analysis pattern 302 except that the regions of the analysis pattern 302 near the gradient features 304 are solid brightness and the regions of the analysis pattern 402 near the gradient features 404 are additional gradient features 304. In one embodiment, the gradient features 404 are adjacent one another and oriented in opposite directions.

Like in FIG. 3A, the arrows in FIG. 4A illustrate the locations along the gradient features 404 where the difference in brightness between the gradient features 404 and the regions of the analysis pattern 402 near the gradient features 404 are minimized. As shown, the arrows illustrate the locations along the gradient features 404 where the differences in brightness are minimized between the gradient features 404 and the adjacent opposite gradient features 404. Such locations may also be the locations where the contrast between adjacent opposite gradient features 404 is minimized.

As shown in FIG. 4B, the test pattern 406 may include a plurality of light features 408 and a plurality of dark features 410. For example, the test pattern 406 may include a plurality of alternating light features 408 and dark features 410. The test pattern 406 may also include one or more gradient features (not shown). The test pattern 406 is displayed for a period time. It will be understood by those of ordinary skill in the art that different display periods may be utilized. In addition, prior to displaying the test pattern 406, the analysis pattern 402 may be displayed to provide a baseline image for the viewer.

Immediately following display of the test pattern 406, the analysis pattern 402 is displayed. FIG. 4C illustrates an image retention analysis pattern 414, which is the result of displaying the analysis pattern 402 after the test pattern 406. The analysis pattern 402 may include a plurality of gradient features 404 near the locations of the display formerly showing the light features 408 of the test pattern 406 and/or near the locations of the display formerly showing the dark features 410 of the test pattern 406. In one embodiment, a single gradient feature 404 is near both a location of the display formerly showing a light feature 408 and a location of the display formerly showing a dark feature 410. The image retention analysis pattern 414 also may include a plurality of light analysis intermediate brightness features 416 displayed at locations formerly showing light features 408 of the test pattern 406 and a plurality of dark analysis intermediate brightness features 418 displayed at locations formerly showing dark features 410 of the test pattern 406. The light analysis intermediate brightness features 416 and dark analysis intermediate brightness features 418 may be gradient features. For example, a first gradient feature may be a light analysis intermediate brightness feature 416 and a second gradient feature may be a dark analysis intermediate brightness features 418. In addition, the first and second gradient features may be oriented in opposite directions.

To determine image retention, comparisons can be made between the light analysis intermediate brightness features 416, such as a first gradient feature, and dark analysis intermediate brightness features 418, such as a second gradient feature, to determine the locations along the gradient features 416 and 418 where the differences in brightness between the gradient features 416 and 418 are minimized.

The arrows of FIG. 4C illustrate the respective locations where such differences in brightness are minimized. If there is no image retention, the arrows in FIGS. 4A and 4C will be located at the same positions. As shown in FIG. 4C, some image retention is present, causing the light analysis intermediate brightness features 416 to be lighter and the dark analysis intermediate brightness features 418 to be darker. The greater the separation of the arrows in FIG. 4C, the greater the image retention. Notably, arranging the gradients in opposite directions causes the light analysis intermediate brightness features 416 and the dark analysis intermediate brightness features 418 to be shifted in the same direction when image retention is present.

Figure 4D:
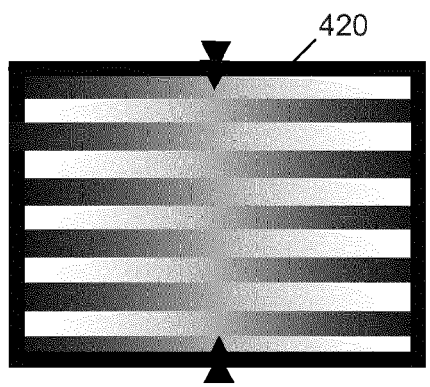

The display will eventually return to an analysis pattern 420 in which no image retention is present, as shown in FIG. 4D.

Figure 5:
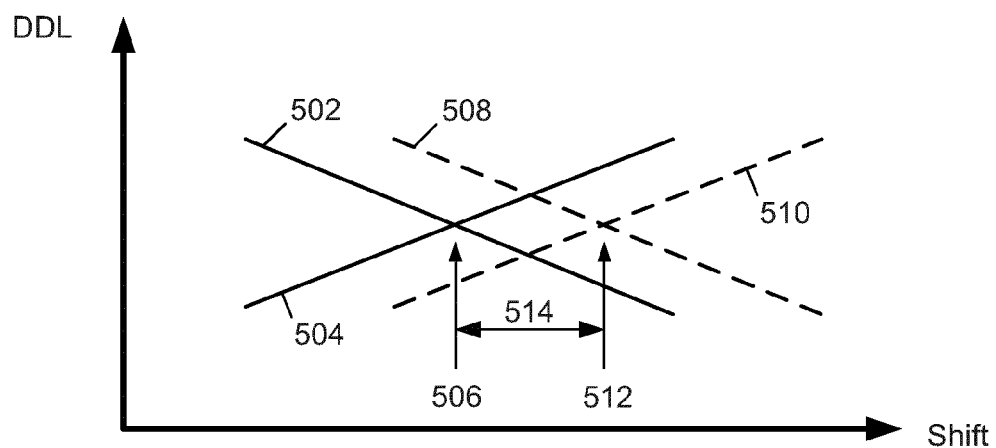
FIG. 5 is a graphical representation illustrating the relationship between DDLs and position shift on a display.

Turning next to FIG. 5, a graphical representation illustrating the relationship between DDLs and position shift on a display is provided. One of ordinary skill in the art will appreciate that known expressions can be used to translate between distance shifted due to image retention and amount of DDLs of image retention. Elements 502 and 504 represent light to dark and dark to light gradients, respectively, such as gradients 404. The arrow 506 corresponds to the location along the gradients 502 and 504 where the difference in brightness is minimized. Element 508 represents a light to dark gradient, such as 418, shifted as a result of image retention. Element 510 represents a dark to light gradient, such as 416, shifted as a result of image retention. The arrow 512 corresponds to the location along the gradients 508 and 510 where the difference in brightness is minimized. The distance shifted as a result of image retention is represented by element 514. Knowing the properties of the display, this distance shifted can be translated to DDLs of image retention using known techniques.

Figure 6A:
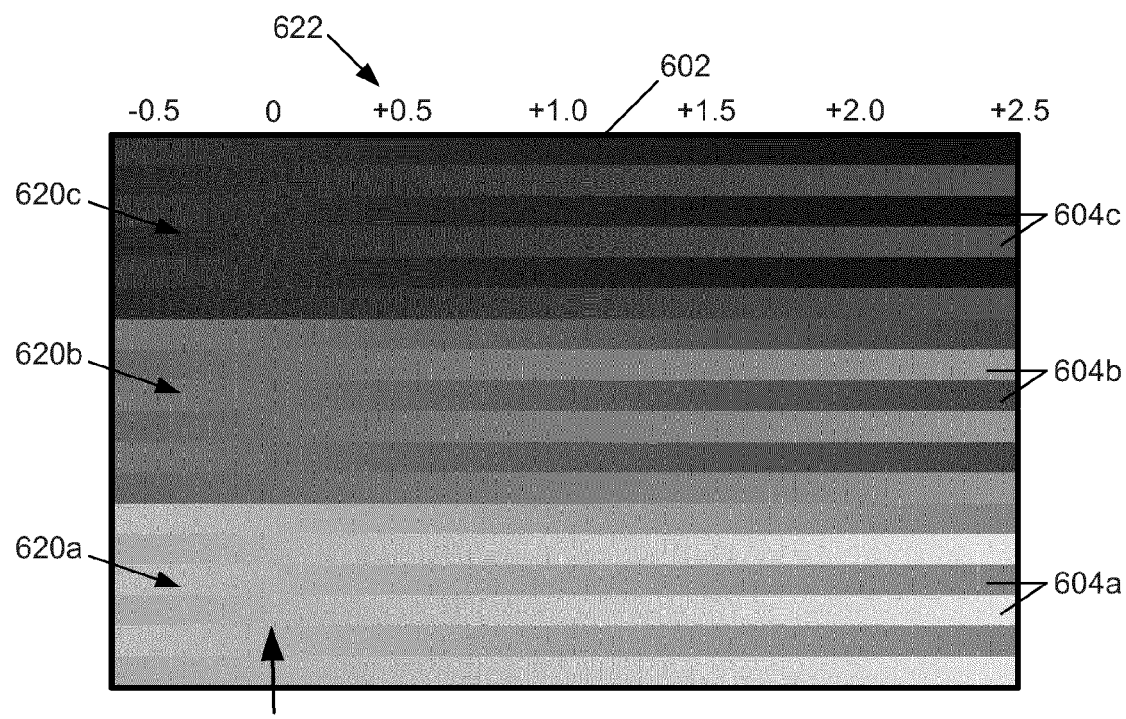
FIGS. 6A-C are representations of sample analysis and test patterns used for determining image retention.
Figure 6B:
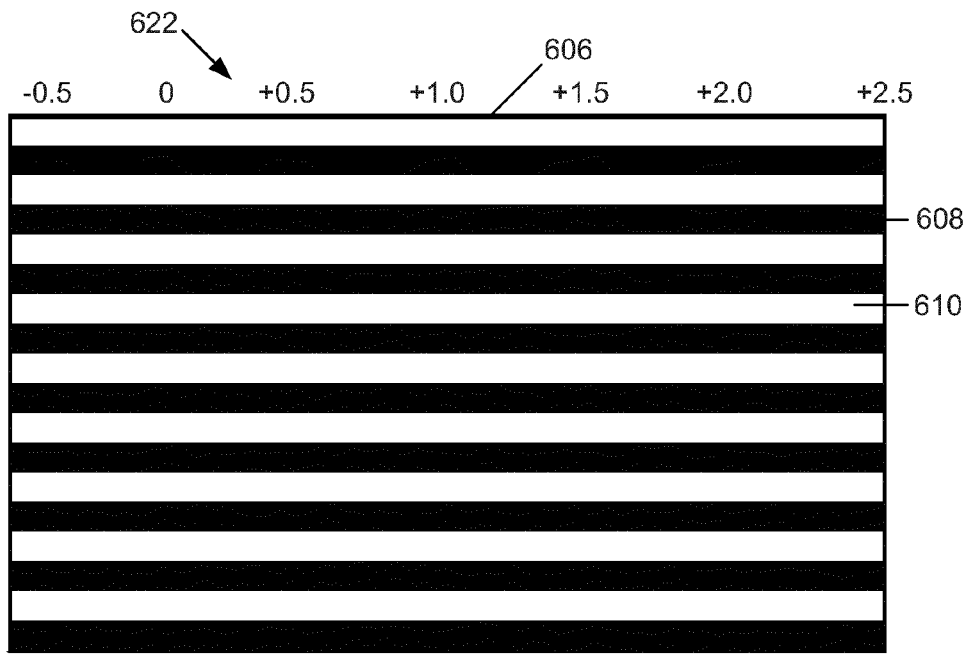
Figure 6C:
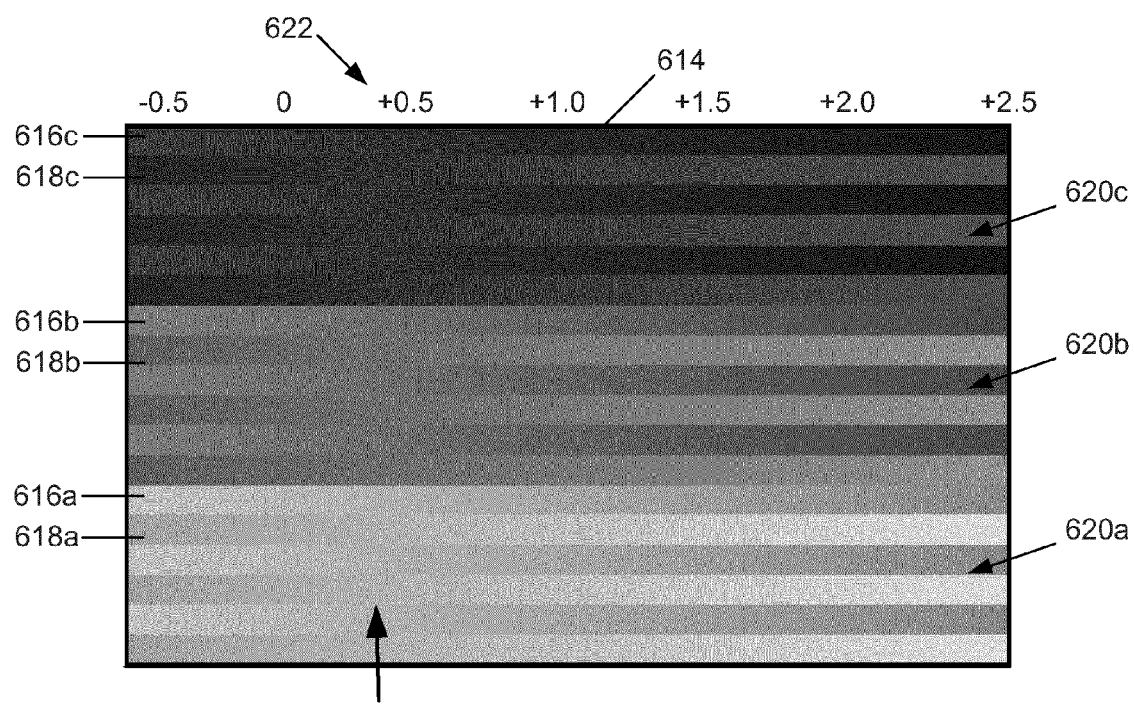

Turning next to FIGS. 6A-C, representations of sample analysis and test patterns used for determining image retention according to an aspect of the invention are provided. The patterns of FIGS. 6A-C are similar to FIGS. 4A-C but include additional features. FIG. 6A illustrates an analysis pattern 602 and FIG. 6B illustrates a test pattern 606. The analysis pattern 602 may include a plurality of gradient features 604 each having a plurality of regions of different levels. The analysis pattern 602 is similar to the analysis pattern 402 except that the analysis pattern 602 includes three regions 620a-c of gradient features 604a-c. In addition, each of the sets of gradient features 604a-c includes a different range of DDLs. For example, the region 620a of gradient features 604a may correspond to a 75% level, the region 620b of gradient features 604b may correspond to a 50% level, and the region 620c of gradient features 606c may correspond to a 25% level.

Like in FIG. 4A, the arrow in FIG. 6A illustrates the locations along the gradient features 604a-c where the differences in brightness between the gradient features 604a-c and the regions of the analysis pattern 602 near the gradient features 604a-c are minimized. As shown, the arrow illustrates the locations along the gradient features 604a-c where the differences in brightness are minimized between the gradient features 604a-c and the adjacent opposite gradient features 604a-c. Such locations may also be the locations where the contrast between adjacent opposite gradient features 604a-c is minimized—specifically, at DDL level 0 because no image retention is present in the analysis pattern 602.

As shown in FIG. 6B, the test pattern 606 may include a plurality of light features 608 and a plurality of dark features 610, and may be the same test pattern as illustrated in FIG. 4B. For example, the test pattern 606 may include a plurality of alternating light features 608 and dark features 610. The test pattern 606 may also include one or more gradient features (not shown). The test pattern 606 is displayed for a period time. It will be understood by those of ordinary skill in the art that different display periods may be utilized. In addition, prior to displaying the test pattern 606, the analysis pattern 602 may be displayed to provide a baseline image for the viewer.

Immediately following display of the test pattern 606, the analysis pattern 602 is displayed. FIG. 6C illustrates an image retention analysis pattern 614, which is the result of displaying the analysis pattern 602 after the test pattern 606. The analysis pattern 602 may include a plurality of regions 620a-c of gradient features 604a-c near the locations of the display formerly showing the light features 608 of the test pattern 606 and/or near the locations of the display formerly showing the dark features 610 of the test pattern 606. In one embodiment, a single gradient feature, such as 604a, is near both a location of the display formerly showing a light feature 608 and a location of the display formerly showing a dark feature 610. The image retention analysis pattern 614 also may include a plurality of light analysis intermediate brightness features 616a-c displayed at locations formerly showing light features 608 of the test pattern 606 and a plurality of dark analysis intermediate brightness features 618a-c displayed at locations formerly showing dark features 610 of the test pattern 606. The light analysis intermediate brightness features 616 and dark analysis intermediate brightness features 618 may be gradient features. For example, a first gradient feature may be a light analysis intermediate brightness feature 616a and a second gradient feature may be a dark analysis intermediate brightness features 618a. In addition, the first and second gradient features may be oriented in opposite directions.

Further, as shown in FIG. 6C, the analysis pattern 602 includes three regions 620a-c of alternating opposing direction intermediate brightness gradients 616a-c and 618a-c. The first region 620a may have light analysis light intermediate brightness gradients 616a located at locations of the display formerly showing light features 608 and dark analysis light intermediate brightness gradients 618a located at locations of the display formerly showing dark features 610. The second region 620b may have light analysis mid intermediate brightness gradients 616b located at locations of the display formerly showing light features 608 and dark analysis mid intermediate brightness gradients 618b located at locations of the display formerly showing dark features 610. The third region 620c may have light analysis dark intermediate brightness gradients 616c located at locations of the display formerly showing light features 608 and dark analysis dark intermediate brightness gradients 618c located at locations of the display formerly showing dark features 610.

The specific configuration of the brightness gradients may vary. For example, the ranges of light levels of the alternating opposing direction light intermediate brightness gradients 616a and 618a may only partially overlap, the ranges of light levels of the alternating opposing direction mid intermediate brightness gradients 616b and 618b may only partially overlap, and/or the ranges of light levels of the alternating opposing direction dark intermediate brightness gradients 616c and 618c may only partially overlap.

In addition, in one embodiment, the ranges of levels of the alternating opposing direction light intermediate brightness gradients 616a and 618a may overlap within the upper third of the display device's brightness range; the ranges of levels of the alternating opposing direction mid intermediate brightness gradients 616b and 618b may overlap within the middle third of the display device's brightness range; and the ranges of levels of the alternating opposing direction dark intermediate brightness gradients 616c and 618c may overlap within the lower third of the display device's brightness range.

To determine image retention, comparisons can be made between the light analysis light intermediate brightness features 616a, such as a first gradient feature, and the dark analysis light intermediate brightness features 618a, such as a second gradient feature, to determine the locations along the gradient features 616a and 618a where the differences in brightness between the gradient features 616a and 618a are minimized. The same comparison can be performed for brightness features 616b-c and 618b-c, respectively.

The arrows of FIG. 6C illustrate the respective locations where such differences in brightness are minimized. If there is no image retention, the arrows in FIGS. 6A and 6C will be located at the same position—position 0. As shown in FIG. 6C, some image retention is present, causing the light analysis intermediate brightness features 616a-c to be lighter and the dark analysis intermediate brightness features 618a-c to be darker. The greater the separation of the arrows in FIG. 6C, the greater the image retention. Notably, arranging the gradients in opposite directions causes the light analysis intermediate brightness features 616a-c and the dark analysis intermediate brightness features 618a-c to be shifted in the same direction when image retention is present. Moreover, each of FIGS. 6A-C includes a key 622 indicating a correlation between the quantity of image retention in DDLs (shown as a range from −0.5 to +2.5) and an amount of shift on the display. Thus, the position of the arrow in FIG. 6C indicates to the viewer the amount of image retention represented in DDLs.

In addition, any of the gradient features, such as gradient features 204, 304, 312, 316, 318, 404, 416, 418, 604x, 616x, and 618x, may include plurality of regions in which the change in the levels of the plurality of regions of the gradient feature is defined by a linear or non-linear function. Any of the gradient features may also include a plurality of regions of different levels that are immediately adjacent and in contact with one another. For example, as shown in FIGS. 6A-C, 3 DDLs are represented by gradients 604x. In addition, there may be dithering between the plurality of regions of different levels. Also, where the analysis pattern includes opposite direction gradient features, the range of DDLs represented by the opposite direction gradient features may only partially overlap, such as illustrated in FIG. 6C.

Also, it may be desirable to use gradients that include only a subset of potential DDL levels. For example, the number of DDLs represented by a gradient may range from about 1 to about 15. In addition, the difference in brightness between adjacent regions of a gradient feature may represent less than 1 DDL. In one embodiment, the gradient features are configured such that image retention may be perceived and measured by a viewer to a precision of tenths of a DDL.

Figure 7:
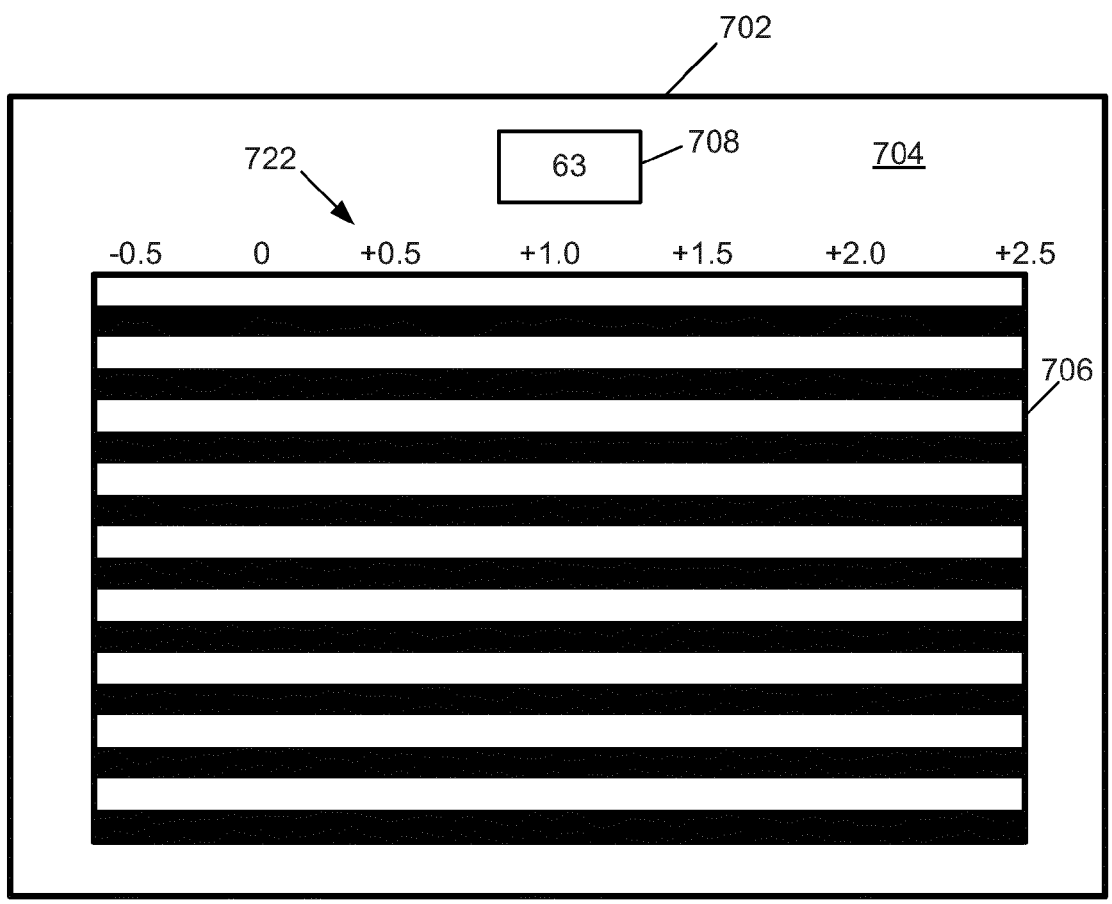
FIG. 7 is a representation of a display outputting a sample pattern for determining image retention.

Turning next to FIG. 7, a representation of a display outputting a sample pattern for determining image retention is provided. The display device 702 includes a display region 704. Shown on the display region 704 is an analysis pattern or a test pattern 706. For example, any of analysis or test patterns 202, 206, 214, 220, 302, 306, 314, 402, 406, 414, 420, 602, 606, or 614 may be shown.

Also shown is an indicator 708 to notify a viewer regarding the timing of the display of the analysis or test pattern 706. For example, the indicator may be an increasing or decreasing counter, or any other visual or audio mechanism for providing viewer feedback regarding the timing of display. According to an aspect of the invention, a test pattern is displayed for a predetermined time period. The time period may range, for example, from 10 seconds to 300 seconds. The indicator 708 may be any mechanism for providing information to the viewer regarding the time period for displaying the test pattern. For example, it may be desirable for the viewer to avoid viewing the displayed test pattern so as not to negatively impact the viewer's ability to perceive contrast when viewing the subsequently displayed image retention analysis pattern.

In addition, the display region 704 also shows a key 722 indicating a correlation between the quantity of image retention in DDLs (shown as a range from −0.5 to +2.5) and an amount of shift.

One advantage of the methodologies discussed herein is that expensive light meter equipment is not required to quantify image retention. Another advantage is that a viewer may be provided with an immediate numerical indicator of the number of DDLs of image retention resulting from the display of a test pattern for a period of time, without requiring the viewer to adjust to display settings or measure the time required for the image retention effects to disappear in order to determine the number of DDLs of image retention. This aspect of the invention may be advantageous because image retention changes as a function of time.

Figure 8A:
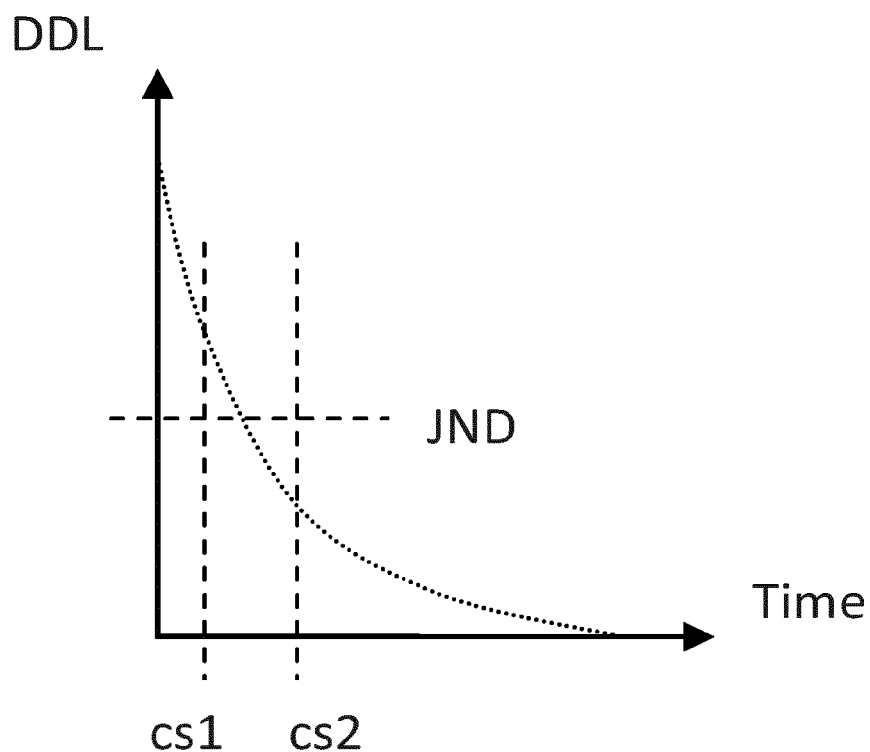
FIG. 8A is a graphical representation illustrating change in image retention over time.

FIG. 8A illustrates a change in image retention over time for an exemplary display. Using the methodology described herein, it is possible to measure the change in amplitude of image retention over time. For example, a measurement of image retention may be made at sequential points in time and the ability of the display to return to a state in which there is no image retention may be tracked over a period of time. In order to record image retention information, a standard camera (such as a point and shoot digital camera or a digital camera in a mobile phone) may be used to capture an image of the display at a point in time. If the indicator 708 is a counter, the point in time may be automatically memorialized in the image. Moreover, because one aspect of the invention provides a user with an immediate indication of image retention, the image retention of the display may be captured at a plurality of points in time at a high frequency.

Figure 8B:
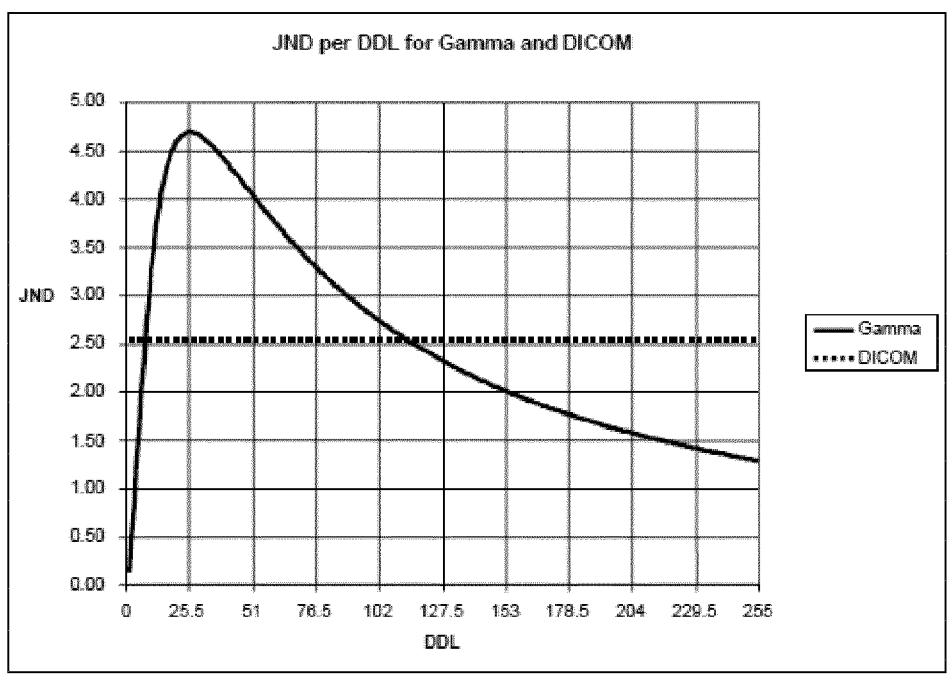
FIG. 8B is a graphical representation illustrating the relationship between measured digital driving levels and just noticeable differences with respect to a gamma transfer curve of an exemplary display.

In addition, it may be desirable to determine when the amount of image retention is less than a just noticeable difference (JND)—a point where image retention is effectively imperceptible to a viewer. FIG. 8A indicates such an event and FIG. 8B illustrates a relationship between DDLs and JNDs in an exemplary display. As will be understood by those of ordinary skill in the art, the relationship between measured DDLs and JNDs may be determined using known techniques. For example, the relationship between DDLs and JNDs may be determined by applying a methodology defined the DICOM standard and using the transfer curve of the display (e.g., a function between DDL and output luminance) as input. For example, typically, a 2.5 JND per DDL step may be achieved in a perceptually linearized system with a white level of 500 cd/m2. In case of a gamma transfer curve, the relationship may be more complex, as illustrated in FIG. 8B, which corresponds to a display driven with 8-bit/channel and having a white point of 500 cd/m2.

Figure 9:
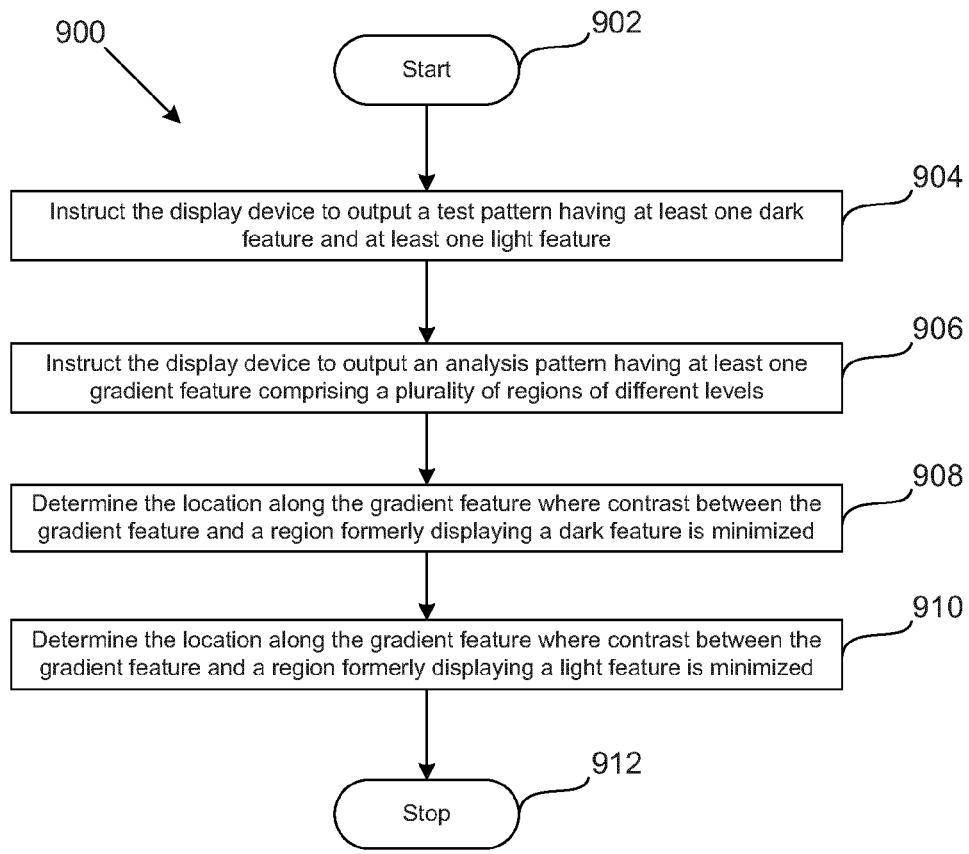
FIG. 9 is a block diagram illustrating a method for determining image retention according to an aspect of the invention.

Turning next to FIG. 9, a flow chart illustrating a method of determining image retention is provided. Flow commences at start block 902, from which flow progresses to process block 904. At process block 904 a display device is instructed to output a test pattern having at least one dark feature and at least one light feature for a period of time. Flow then continues to process block 906 wherein the display device is instructed to output an analysis pattern having at least one gradient feature comprising a plurality of regions of different levels.

Progression then continues to process block 908 wherein it is determined at which location along the gradient feature the contrast between the gradient feature and a region formerly displaying a dark feature is minimized. Flow continues to process block 910 wherein it is determined at which location along the gradient feature the contrast between the gradient feature and a region formerly displaying a light feature is minimized. Flow then continues to termination block 912.

Figure 10:
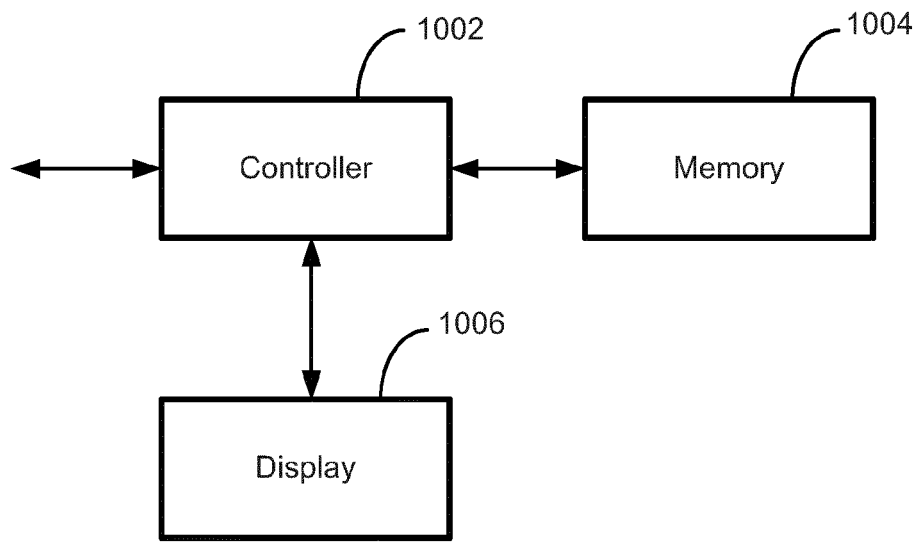
FIG. 10 is a block diagram illustrating a system according to an aspect of the invention.

Turning next to FIG. 10, provided is a block diagram of a display system according to an aspect of the invention. In its simplest form, the system may include a controller 1002, memory 1004 and a display device 1006. The controller 1002 may be configured to perform each of the functions identified in process blocks 904, 906, 908 and 910. In addition, the controller 1002 may be configured to perform all functions described herein with reference to any of the figures. In doing so, the controller may access and store information in memory 1004. Also, the functionality of described herein may be implemented in software stored in memory 1004 and accessed by the controller 1002. Moreover, the memory 1004 and controller 1006 may be internal or external to the display device 1006. For example, the software 1006 and controller 1004 may reside in a general purpose computer attached to a display device 1006.

It will be understood by those of skill in the art that the controller 1002 may be any type of control circuit implemented as one or combinations of the following: as a hard-wired circuit; programmable circuit, integrated circuit, memory and i/o circuits, an application specific integrated circuit, application-specific standard product, microcontroller, complex programmable logic device, field programmable gate arrays, other programmable circuits, or the like. The memory 1004 may be any type of storage as will be understood by those of skill in the art. Additionally, the display device 1006 may be any type of display device capable of being affected by image retention, e.g., CRT, passive displays, such as LED, OLED, EL, CCFL, etc.

In addition the functions and methodology described herein may be implemented in part or in whole as a firmware program loaded into non-volatile storage (for example, an array of storage elements such as flash RAM or ferroelectric memory) or a software program loaded from or into a data storage medium (for example, an array of storage elements such as a semiconductor or ferroelectric memory, or a magnetic or optical medium such as a disk) as machine-readable code, such code being instructions executable by an array of logic elements such as a microprocessor, embedded microcontroller, or other digital signal processing unit. Embodiments also include computer program products for executing any of the methods disclosed herein, and transmission of such a product over a communications network (e.g. a local area network, a wide area network, or the Internet). Thus, the present invention is not intended to be limited to the embodiments shown above but rather is to be accorded the widest scope consistent with the principles and novel features disclosed in any fashion herein.

Although the invention has been shown and described with respect to a certain preferred embodiment or embodiments, it is obvious that equivalent alterations and modifications will occur to others skilled in the art upon the reading and understanding of this specification and the drawings. In particular, in regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent). In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method for evaluating image retention of a display device comprising:
    instructing the display device to output a test pattern having at least one dark feature and at least one light feature;
    instructing the display device to stop outputting the test pattern and to instead output an analysis pattern having at least one gradient feature comprising a plurality of regions of different levels and an intermediate brightness feature;
    comparing the intermediate brightness feature and the gradient feature to determine a location of the gradient feature at which a difference in brightness between the intermediate brightness feature and the gradient feature is minimized;
    determining the image retention of the display device based on the determined location of the gradient feature at which the difference in brightness between the intermediate brightness feature and the gradient feature is minimized; and
    outputting the determined image retention;
    wherein the intermediate brightness feature includes at least one of:
        a dark analysis intermediate brightness feature in the location of the display formerly showing a dark feature; or
        a light analysis intermediate brightness feature in the location of the display formerly showing a light feature;
    wherein at least one of the at least one gradient feature is near a location of the display formerly showing a dark feature; and
    wherein at least one of the at least one gradient feature is near a location of the display formerly showing a light feature.

2. The method of claim 1 wherein the change in the levels of the plurality of regions of the at least one gradient feature is defined by a linear or non-linear function.

3. The method of claim 1 wherein the plurality of regions of different levels of the at least one gradient feature of the analysis pattern are immediately adjacent and in contact with one another.

4. The method of claim 3 wherein the at least one gradient feature comprises dithering between the plurality of regions of different levels.

5. The method of claim 1 wherein the number of DDLs represented by the plurality of regions of the at least one gradient feature ranges from 1 to about 15.

6. The method of claim 1 further comprising instructing the display device to output a test pattern having at least one dark feature and at least one light feature; instructing the display device to output an analysis pattern having at least one gradient feature comprising a plurality of regions of different levels; and displaying a key indicating a correlation between output light level and DDL; wherein at least one of the at least one gradient feature is near a location of the display formerly showing a dark feature, and wherein at least one of the at least one gradient feature is near a location of the display formerly showing a light feature.

7. The method of claim 1 further comprising indicating a length of time during which at least one of the test pattern or the analysis pattern is output.

8. The method of claim 1 further comprising capturing with a camera the analysis pattern output by the display device.

9. The method of claim 1 wherein a single gradient feature of the analysis pattern is near both the location of the display formerly showing a dark feature and the location of the display formerly showing a light feature.

10. The method of claim 1 wherein the test pattern comprises at least one gradient feature comprising a plurality of regions of different levels, wherein the at least one gradient feature is near at least one of the at least one dark feature or at least one of the at least one light feature.

11. The method of claim 10 wherein the gradient feature of the test pattern and the gradient feature of the analysis pattern are identical.

12. The method of claim 1 wherein the analysis pattern comprises:
 a first gradient feature located at the location of the display formerly showing a dark feature; and
 a second gradient feature located at the location of the display formerly showing a light feature.

13. The method of claim 12, wherein the first and second gradient features are oriented in opposite directions.

14. The method of claim 12 wherein the range of light levels represented by the first gradient feature only partially overlaps the range of light levels represented by the second gradient feature.

15. The method of claim 12 further comprising comparing the first gradient feature and the second gradient feature to determine the portions of the first gradient feature and second gradient feature at which difference in brightness between the first gradient feature and the second gradient feature is minimized.

16. A method for evaluating the image retention of a display device comprising:
 instructing the display device to output a test pattern having at least one dark feature and at least one light feature; and
 instructing the display device to output an analysis pattern having at least one gradient feature comprising a plurality of regions of different levels, wherein:
  at least one of the at least one gradient feature is near a location of the display formerly showing a dark feature;
  at least one of the at least one gradient feature is near a location of the display formerly showing a light feature;
  the test pattern comprises a plurality of alternating dark features and light features; and
  the analysis pattern comprises three regions, wherein
  the first region comprises alternating opposing direction light intermediate brightness gradients located at locations of the display formerly showing alternating dark features and light features,
  the second region comprises alternating opposing direction mid intermediate brightness gradients located at locations of the display formerly showing alternating dark features and light features, and
  the third region comprises alternating opposing direction dark intermediate brightness gradients located at locations of the display formerly showing alternating dark features and light features.

17. The method of claim 16 wherein
 the ranges of light levels of the alternating opposing direction light intermediate brightness gradients only partially overlap,
 the ranges of light levels of the alternating opposing direction mid intermediate brightness gradients only partially overlap, and
 the ranges of light levels of the alternating opposing direction dark intermediate brightness gradients only partially overlap.

18. The method of claim 16 wherein:
 the ranges of levels of the alternating opposing direction light intermediate brightness gradients overlap within the upper third of the display device's brightness range;
 the ranges of levels of the alternating opposing direction mid intermediate brightness gradients overlap within the middle third of the display device's brightness range; and
 the ranges of levels of the alternating opposing direction dark intermediate brightness gradients overlap within the lower third of the display device's brightness range.

19. A system for evaluating the image retention of a display device comprising computer readable code on a non-transitory computer readable medium, wherein the computer readable code is adapted to perform the steps of claim 1.

* * * * *